United States Patent Office 3,177,003
Patented Apr. 6, 1965

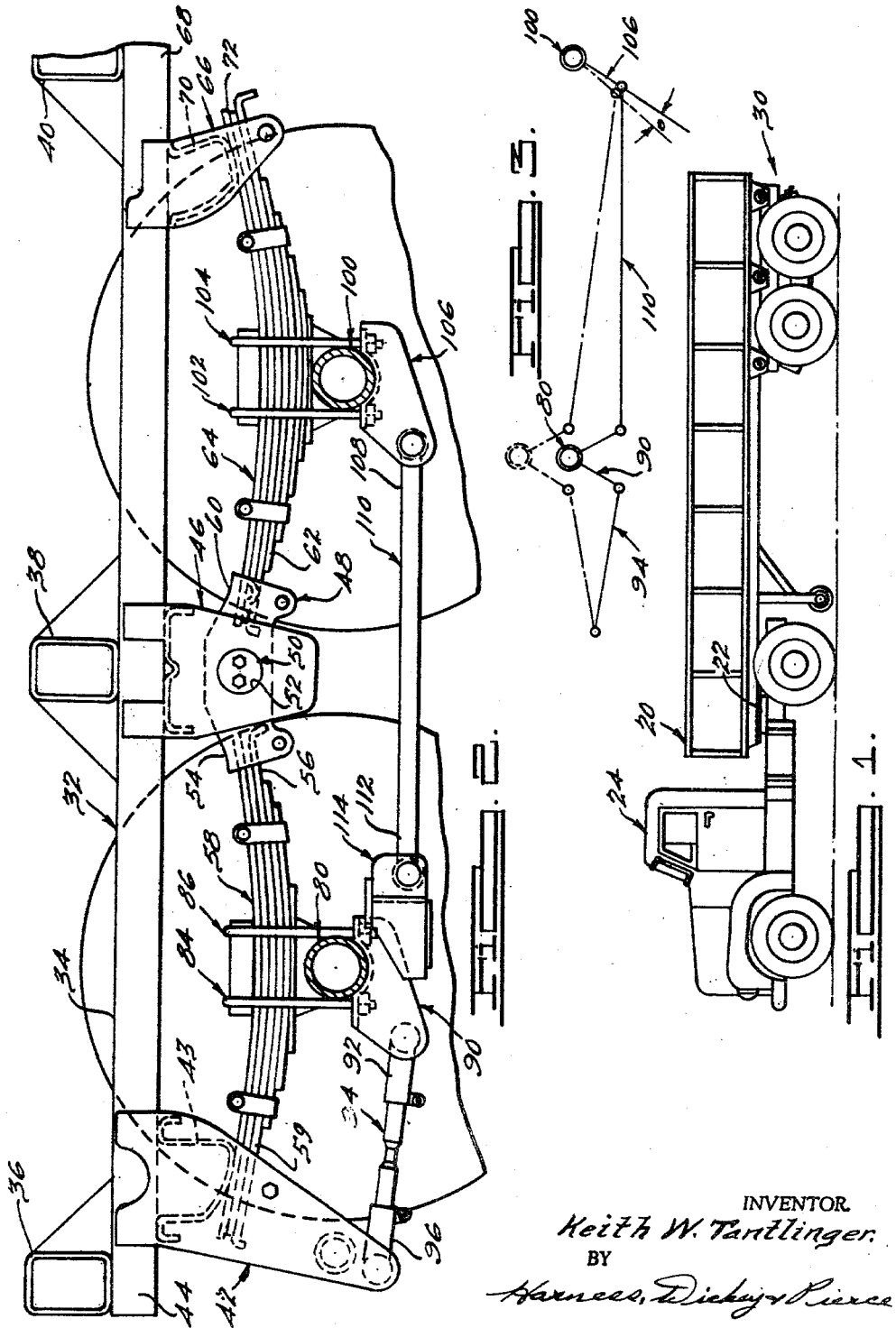

3,177,003
TANDEM SUSPENSION CONSTRUCTION
Keith W. Tantlinger, Grosse Pointe Shores, Mich., assignor to Fruehauf Corporation, Detroit, Mich., a corporation of Michigan
Filed Jan. 11, 1963, Ser. No. 250,851
3 Claims. (Cl. 280—104.5)

This invention relates generally to wheel suspensions for heavy duty highway vehicles, and more particularly to an improved anti-hop equalized tandem axle suspension construction.

Heavy duty trailers often employ equalized tandem axle wheel suspensions comprising two longitudinally spaced independently sprung axles having load equalizing levers therebetween. In normal over-the-road operation, loads on the two axles of the wheel suspension are substantially equalized. The axles are generally maintained in alignment with one another transversely of the longitudinal axis of the vehicle by suitable radius or torque rods that extend between the frame of the wheel suspension and the axle.

One deleterious phenomenon associated with the use of such wheel suspensions is known as "wheel hop," which occurs when an unloaded or lighty loaded vehicle is rapidly braked. It is characterized by rapid and extremely violent vertical oscillation of the front axle or sometimes both of the axles of the tandem suspension. Obviously, such wheel hop is undesirable, since it reduces braking efficiency, has a deleterious effect on the wheel suspension, and subjects the contents of the vehicle to excessive shaking and pounding.

The "wheel hop" phenomenon is induced in part by rotation of the axles about their own axes upon braking, resulting in torsional deflection of the springs of the suspension. Such torsional deflection of the springs is transferred through the equalizer levers of the wheel suspension in a manner that makes a bad situation worse. To counteract rotation of the axles and torsional loading of the springs upon braking, the front ends of the radius rods have heretofore been connected to the suspension frame and the rearward ends of the radius rods have been connected to the axles substantially below the central axis thereof.

However, this expedient has not entirely eliminated brake hop due to braking in that rotation of the entire spring and axle assembly is also transmitted through the equalizer lever in such a manner as to transfer loads between the axles and induce "wheel hop."

In accordance with the instant invention, the radius rods for the rear axle are connected to the rear axle substantially below the central axis thereof and to the front axle substantially below its central axis. The front radius rods are connected to the front axle substantially below the central axis thereof and to the frame of the wheel suspension in the conventional manner. Thus, "wheel hop" or, in other words, upward movement of the front axle relative to the suspension frame torques the rear axle in such a manner that a counter torque is applied to the equalizing levers, tending to preclude deleterious load transfer between axles, thereby minimizing "wheel hop."

Accordingly, one object of the instant invention is an improved equalized tandem axle wheel suspension.

Another object is an improved tandem axle wheel suspension that minimizes wheel hop due to rotation of the spring and axle assemblies, as well as to rotation of the axles.

Other objects and advantages of the instant invention will be apparent in the following specification, claims and drawings, wherein:

FIGURE 1 is a side plan view of a heavy duty highway vehicle;

FIG. 2 is a cross sectional view showing the front and rear axles of the wheel suspension and the radius rod linkage therebetween; and FIG. 3 is a diagrammatic view of how the components of the instant wheel suspension move relative to one another to minimize "wheel hop."

Referring to FIGURE 1 of the drawings, a heavy duty trailer 20 is coupled through a fifth wheel 22 to a tractor 24 in the conventional manner. The trailer 20 is supported by an equalized tandem axle wheel suspension 30, which is preferably secured thereto in the manner taught in application Serial No. 38,826, filed June 27, 1960, for: Trailer Suspension and assigned to the assignee of the instant invention.

As best seen in FIG. 2, the tandem axle wheel suspension 30 comprises a rectangular frame 32 including a plurality of laterally spaced longitudinal stringers, one of which is shown, and designated by the numeral 34, and transverse stringers 36, 38 and 40. For the purpose of simplicity, only one side of the wheel suspension 30 will be described, it being understood that like spring and radius rod assemblies are provided on opposite sides of the frame 32.

The configuration and orientation of the springs, hangers and equalizing levers of the wheel suspension 30 is conventional. For example, a front hanger 42 having a centrally disposed bumper 43 depends downwardly from a front end 44 of the longitudinal stringer 34. An intermediate hanger 46 depends downwardly from the stringer 34 for the support of a yoke 48. The yoke 48 is pivotally supported by a shaft 50 that is accepted in complementary aligned apertures 52 in the hanger 40. The yoke 48 is of generally U-shaped vertical transverse cross section, for a reason to be discussed.

A front end portion 54 of the yoke 48 accepts a rearward end 56 of a leaf spring 58. A front end portion 59 of the spring 58 is supported by the bumper 43 in the hanger 42. A rear end portion 60 of the yoke 48 accepts a front end portion 62 of a rear spring 64. A rear hanger 66 depends downwardly from a rear end 68 of the stringer 34, a bumper 70 thereon supporting a rear end 72 of the spring 64.

A front axle 80 is secured to the front spring 58 intermediate the front end portion 59 and the rear end portion 56 thereof as by a pair of U-bolts 84 and 86. A downwardly depending bracket 90 underlies the axle 80 and pivotally accommodates a rear end portion 92 of a front radius rod 94. A front end portion 96 is pivotally secured to the front hanger 42.

Similarly, a rear axle 100 is secured to the rear spring 64 intermediate the front end 62 and rear end 72 thereof, as by a pair of U-bolts 102 and 104. A downwardly depending bracket 106 underlies the axle 100 and pivotally accommodates a rear end portion 108 of a rear radius rod 110.

In accordance with the instant invention, the rear radius rod 110 is pivotally coupled at a front end portion 112 thereof to a bracket 114 that is secured as by welding to the bracket 90 underlying the axle 80. The radius rod 110 extends generally horizontally between and well below the axles 80 and 100.

The aforesaid orientation of the rear radius rod 110 of the wheel suspension 30 of the instant invention has been found to minimize wheel hop. As discussed hereinbefore, any tendency for the axle 80 to move upwardly upon the occurrence of braking effects a clockwise rotation of the yoke 48, tending to bias the front end portion 62 of the rear spring 64 downwardly. Such clockwise rotation of the yoke 48, if not alleviated, tends to aggravate wheel hop since it tends to increase the loading of the rear axle 100 as the front axle 80 is unloaded.

However, in accordance with the instant invention, and as best seen in FIG. 3 of the drawings, as the front axle 80 moves upwardly, the radius rod 110 moves to the position shown in broken lines, tending to torque the rear axle 100 through the angle theta ($\theta$) as shown, which torque is effective on the spring to exert a clockwise bias thereon about the rear bumper 70, which, in turn, biases the front end portion 62 of the rear spring 64 upwardly. Upward movement of the front end portion 62 of the rear spring 64 rotates the yoke 48 in the counterclockwise direction. Thus, it will be seen that vertical movement of the front axle incident to wheel hop induces a counteracting force through the radius rod 110, rear axle 100, and rear spring 64 and operative on the equalizing lever 48. The wheel suspension 30 is thus self-stabilizing, and wheel hop due to rapid braking is minimized.

It is to be understood that the specific construction of the improved tandem suspension construction herein disclosed and described is presented for the purpose of explanation and illustration and is not intended to indicate limits of the invention, the scope of which is defined by the following claims.

What is claimed is:

1. An equalized multiple axle wheel suspension comprising
    an elongated frame,
    front and rear axles extending laterally of said frame,
    a pair of longitudinally spaced and aligned elliptical springs for suspending said axles, respectively, from said frame,
    an equalizing lever pivotally supported by said frame between and in alignment with said springs, said lever having end portions pivotally engageable with adjacent end portions of said springs,
    a first radius rod extending between and pivotally coupled to said axles, respectively, said radius rod being attached to the rear axle at a point spaced from the central axis thereof so that a line drawn between the central axis of the rear axle and the point of attachment of said radius rod thereto is angularly related to the longitudinal axis of said radius rod so that tensioning of said radius rod due to upward movement of said front axle produces a torque on said rear axle, and
    a second radius rod extending between the front axle and said frame.

2. A wheel suspension in accordance with claim 1 wherein the point of attachment of said first radius rod to said rear axle is below the central axis thereof.

3. A wheel suspension in accordance with claim 1 wherein the points of attachment of said first and second radius rods to said axles are below the central axes of said axles, respectively.

References Cited by the Examiner

UNITED STATES PATENTS 1,877,970   9/32   Reid _____ 280—104.5
2,606,769   8/52   Delay _____ 280—104.5 X A. HARRY LEVY, *Primary Examiner.*

PHILIP ARNOLD, *Examiner.*